United States Patent
Vidal-Naquet et al.

(10) Patent No.: US 9,258,490 B2
(45) Date of Patent: Feb. 9, 2016

(54) SMOOTHING OF GHOST MAPS IN A GHOST ARTIFACT DETECTION METHOD FOR HDR IMAGE CREATION

(71) Applicant: KONICA MINOLTA LABORATORY U.S.A., INC., San Mateo, CA (US)

(72) Inventors: Michel Julien Vidal-Naquet, San Mateo, CA (US); Alexis Bienvenu, Méré (FR)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 156 days.

(21) Appl. No.: 14/194,041

(22) Filed: Feb. 28, 2014

(65) Prior Publication Data
US 2015/0249779 A1    Sep. 3, 2015

(51) Int. Cl.
*H04N 5/235* (2006.01)
*G06K 9/40* (2006.01)

(52) U.S. Cl.
CPC .............. *H04N 5/2355* (2013.01); *G06K 9/40* (2013.01); *H04N 5/235* (2013.01)

(58) Field of Classification Search
None
See application file for complete search history.

(56) References Cited

U.S. PATENT DOCUMENTS

2011/0188744 A1    8/2011    Sun

OTHER PUBLICATIONS

Srikantha et al., "Ghost Detection and Removal for High Dynamic Range Images: Recent Advances", Signal Processing: image Communications, 27(6), pp. 650-662, 2012.
Gallo et al., "Artifact-free High Dynamic Range Imaging", IEEE International Conference on Computational Photography, Apr. 2009.
Karadag et al., "Color Preserving HDR Fusion for Dynamic Scenes", Journal of WSCG 20(2): 155-160 (2012).
Danielsson, "Euclidean Distance Mapping", Computer Graphics and Image Processing 14, 227-248 (1980).

*Primary Examiner* — Roberto Velez
*Assistant Examiner* — Yih-Sien Kao
(74) *Attorney, Agent, or Firm* — Chen Yoshimura LLP

(57) ABSTRACT

An improved ghost-artifact detection and removal method for high-dynamic range (HDR) image creation and related apparatus are described. A binary ghost map is first generated for each image of the multiple input images by a ghost-artifact detection process, where one of the binary values indicate ghost pixels and the other indicates non-ghost pixels. Each binary ghost map is smoothed to generate a continuous-tone ghost map, by changing the pixel value of each non-ghost pixel of the binary map to a ghost value between the two binary values. The ghost value is calculated using a monotonous function of the distance between the non-ghost pixel of the binary map and the nearest ghost pixel. Ghost pixels in the binary ghost map are kept as fully ghost pixel in the continuous-tone ghost map. This method helps to reduce visibility of artifacts at ghost boundaries without losing small detected ghost regions.

9 Claims, 2 Drawing Sheets

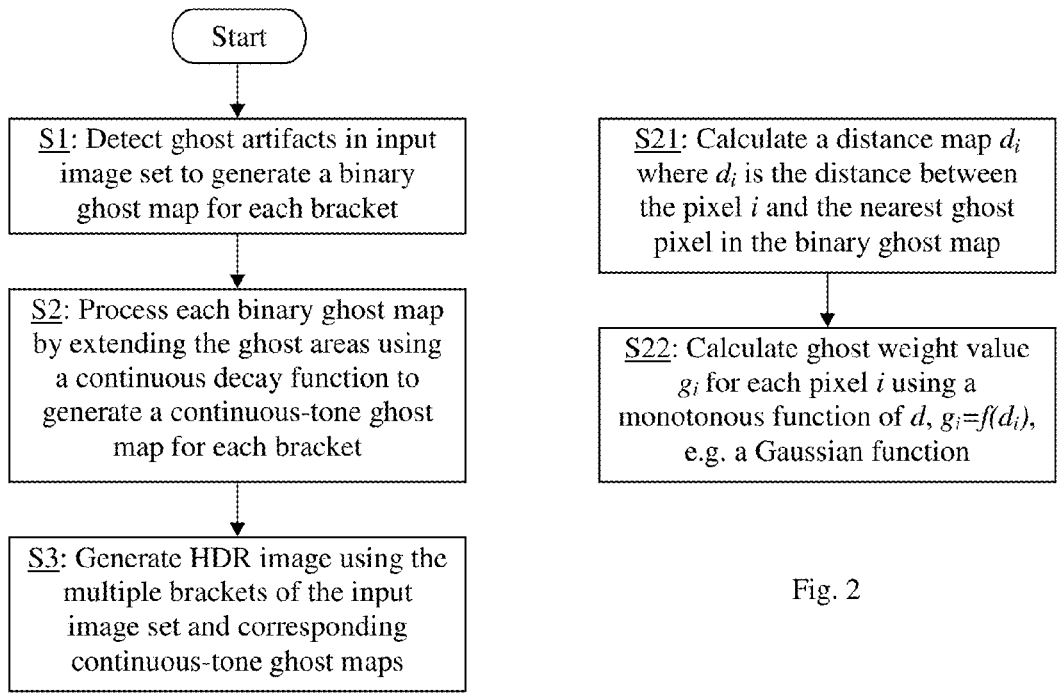
Fig. 1
Fig. 2
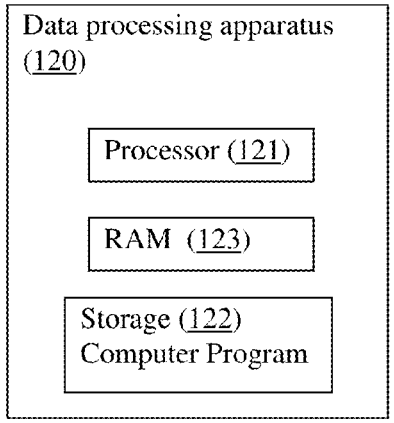
Fig. 4A
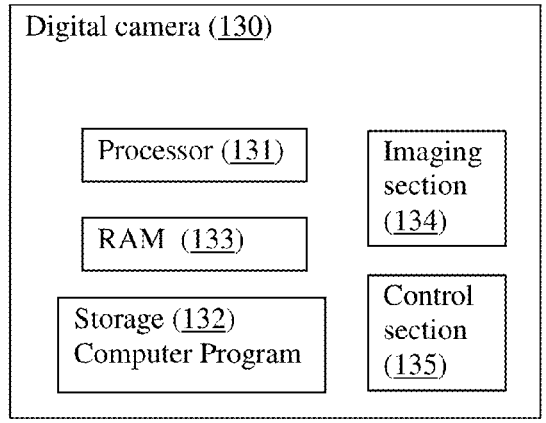
Fig. 4B

SMOOTHING OF GHOST MAPS IN A GHOST ARTIFACT DETECTION METHOD FOR HDR IMAGE CREATION

BACKGROUND OF THE INVENTION

1. Field of the Invention

This invention relates to high dynamic range (HDR) imaging, and in particular, it relates to removal of ghost artifact during HDR image creation.

2. Description of Related Art

High dynamic range (HDR) imaging is a technique used in image processing and digital photography to handle sources that have extremely large ranges of brightness (light intensity). For example, an outdoor scene in daylight may include blue sky and sunlit objects as well as objects in shadows; a night scene may include neon lights and brightly lit objects as well as poorly lit objects; an indoor scene may include bright windows as well as darker areas, etc. These scenes pose a challenge for imaging devices such as digital cameras; the dynamic range of the image sensor of currently available digital cameras often cannot adequately image such scenes. If the exposure level is adequate for capturing details of darker areas of the scene, the brighter areas will often be overexposed with details lost; conversely, if the exposure level is adequate for capturing details of brighter areas of the scene, the darker areas will often be underexposed with details lost.

HDR imaging techniques deal with this problem by taking multiple images of the same scene at various exposure levels, and then digitally merging the multiple images to create an HDR image that contains information from the original multiple images, so that details in both brighter and darker areas are adequately expressed in the HDR image.

Bracketing is a technique in photography for taking multiple images of the same scene using different exposure levels or other different setting values such as focus, depth of field, etc. Some cameras can perform autobracketing, i.e., automatically changing the setting multiple times and take multiple images. Each of the multiple images is sometimes referred to as a bracket. Multiple images generated by exposure bracketing can be used to create HDR images.

During HDR image creation, ghosting artifacts can appear when object have moved, appeared or disappeared in between the shooting of the different images (brackets). For example, during the shooting of three brackets, if a person walks into the scene only in the third bracket, then the HDR image created from the three brackets (without ghost removal techniques) will have a semi-transparent figure of the person over the scene ("ghost"). Such objects are referred to as ghost-inducing objects in this disclosure Methods have been proposed to identify such ghost-inducing objects within the multiple images, so that the images can be processed to reduce or eliminate ghosting effects in the resulting HDR image. Some of these techniques are described in a review paper, A. Srikantha and D. Sidibé, Ghost Detection and Removal for High Dynamic Range Images: Recent Advances, Signal Processing: image Communications, 27(6), pp. 650-662, 2012. U.S. Pat. Appl. Pub. No. 2011/0188744 describes a method for ghost artifact removal using a normalized cross-correlation (NCC) technique.

SUMMARY

In HDR image creation methods, after ghost-inducing objects are detected, a ghost map is generated for each bracket to indicate whether each pixel in that bracket is or is not a part of a ghost-inducing object. In some conventional methods, ghost maps are binary pixel maps, with one pixel value (e.g. 1) indicating that the pixel of that bracket is ghost-inducing and will not be used in constructing the HDR image, and the other pixel value (e.g. 0) indicating that the pixel of that bracket is not ghost-inducing and will be used in constructing the HDR image. Thus, in the resulting HDR image, areas involved in ghost-inducing objects will have contributions from fewer brackets (or different brackets) than areas not involved in any ghost-inducing objects. This may cause artifacts in the HDR image such that areas involved in ghost-inducing objects may have different color tones than adjacent areas. If not taken care of properly, this results in visible artifacts that correspond to sharp edges between image areas where different numbers of brackets (or different brackets) are used. Such artifacts are particularly problematic when the ghost-inducing object was present against a relatively featureless background area.

Various methods have been proposed to smooth the ghost maps to correct such artifact. For example, Poisson-based smoothing is described in O. Gallo, N. Gelfand, W. Chen, M. Tico, and K. Pulli, Artifact-free High Dynamic Range Imaging, IEEE International Conference on Computational Photography, April 2009. A method that uses Laplacian pyramid to smooth tile maps for optimal HDR rendering is described in Gokdeniz Karadag, Ahmet Oguz Akyüz: Color Preserving HDR Fusion for Dynamic Scenes. Journal of WSCG 20(2): 155-160 (2012). Some of the proposed methods are computationally expensive. Some proposed methods also blur the ghost and non-ghost boundaries of the binary ghost maps so that some pixels that were deemed ghost in the binary ghost map will now have an (albeit small) contribution to the HDR image, which may sometimes cause other artifacts.

The present invention is directed to an improved method and related apparatus for smoothing binary ghost maps in an HDR image creation process to help reduce visibility of artifacts.

An object of the present invention is to smooth ghost maps without losing small detected ghost regions.

Another object of the present invention is to compute smoothed ghost map with high performance.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a high dynamic range (HDR) image from a set of multiple images at different exposure levels, which includes: (a) detecting ghost-inducing objects in the set of multiple images to generate a binary ghost map for each image, each binary ghost map having a plurality of pixels, each pixel having either a first predetermined pixel value indicating that a corresponding pixel in the corresponding image is ghost-inducing or a second predetermined pixel value indicating that a corresponding pixel in the corresponding image is not ghost-inducing; (b) generating a continuous-tone ghost map from each binary ghost map, including: (1) for each pixel of the binary ghost map that has the first predetermined pixel value, assigning the first predetermined pixel value to a corresponding pixel of the continuous-tone ghost map; and (b2) for each pixel of the binary ghost map that has the second predetermined pixel value, calculating a distance between the pixel and a nearest pixel in the binary ghost map that has the first pixel value, calculating a pixel value as a function of the distance, the function having the first predetermined pixel value when the distance is zero and changing monotonously toward the second predetermined pixel value when the distance is greater than zero, and assigning the calculated pixel value to a corresponding pixel of the continuous-tone ghost map; and (c) generating the HDR image using the set of multiple images and the corresponding continuous-tone ghost maps.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

In another method, the present invention provides a digital camera which includes the computer usable non-transitory medium described above, and further includes an imaging section for obtaining images; a control section for controlling the imaging section to obtain a set of images having different exposure levels.

It is to be understood that both the foregoing general description and the following detailed description are exemplary and explanatory and are intended to provide further explanation of the invention as claimed.

BRIEF DESCRIPTION OF THE DRAWINGS

FIGS. 1 and 2 schematically illustrate a method for HDR image creation according to an embodiment of the present invention.

FIGS. 4A and 4B schematically illustrate a data processing apparatus and a camera, respectively, in which embodiments of the present invention may be implemented.

DETAILED DESCRIPTION OF PREFERRED EMBODIMENTS

Figure 3A:
FIG. 3A shows an exemplary binary ghost map.

FIG. 1 schematically illustrates a process for creating an HDR image from a set of multiple images (brackets), which have been obtained by photographing the same scene at different exposure levels. First, the multiple brackets are processed to detect ghost-inducing objects in one or more of the brackets (step S1). This step generally involves comparing the multiple brackets to detect differences that are not attributable to different exposure levels. Many algorithms are known for detecting ghost artifacts in image sets, and any suitable algorithm can be used to accomplish step S1. In some known methods, each bracket is divided into smaller windows and the corresponding windows in the multiple brackets are compared to each other. Some methods calculate normalized cross-correlation values (NCC) of pairs of windows; the NCC values tend to be high for pairs of windows that have different pixel intensities due to different exposure but contain no ghost-inducing objects, and low if a ghost-inducing object is present in one bracket but not the other. As a result of the detecting step, a binary ghost map is generated for each bracket. The binary ghost map is a pixel map having the same number of pixels as the input image itself; each pixel of the binary ghost map has a first predetermined value (e.g. 1) if the corresponding pixel in the image is a part of a ghost-inducing object, and a second predetermined value (e.g. 0) if the corresponding pixel is not a part of any ghost-inducing object. FIG. 3A shows an exemplary binary ghost map for a bracket generated by step S1.

The binary ghost map for each bracket is processed, by extending the ghost areas using a monotonous smoothing function, to generate a continuous-tone ghost map for each bracket (step S2). This step is illustrated in further detail in FIG. 2. The smoothing function is a function of the distance d between a pixel and the nearest ghost pixel in the binary ghost map. The distance d is by definition zero for pixels that are ghost pixels in the binary ghost map. Given a binary ghost map, the distance $d_i$ for each pixel i (i being the pixel index) can be calculated (step S21). Any suitable algorithm may be used, such as those that calculate an exact or approximate Euclidian distance transform. Many fast implementations of distance transform exist. In one example, Danielsson's algorithm, described in Per-Erik Danielsson, Euclidean Distance Mapping, Computer Graphics and Image Processing 14, 227-248 (1980), may be used. This algorithm can calculate the distance d in two pass over the entire map with high performance. Then, a ghost-weight value $g_i$ for each pixel i is calculated using a function $f(d)$ which has the first predetermined value (e.g. 1) for d=0 and changes monotonously toward the second predetermined value (e.g. 0) for d>0 (step S22). In one implementation, the function $f(d)$ is a Gaussian function:

$$f(d) = K\exp(-d^2/\sigma^2)$$

where K and σ are parameters that can be determined empirically. Any suitable values may be used. In one particular implementation, the parameter values are: K=1 and σ=26. In other words, $$g_i = f(d_i) = K\exp(-d_i^2/\sigma^2)$$

The ghost-weight values $g_i$ for all pixels i constitute the continuous-tone ghost map.

Because the function $f(d)$ satisfies $f(d)=1$ for d=0, it is ensured that all ghost pixels in the binary ghost map are given a full ghost weight and will remain as ghost pixels.

Figure 3B:
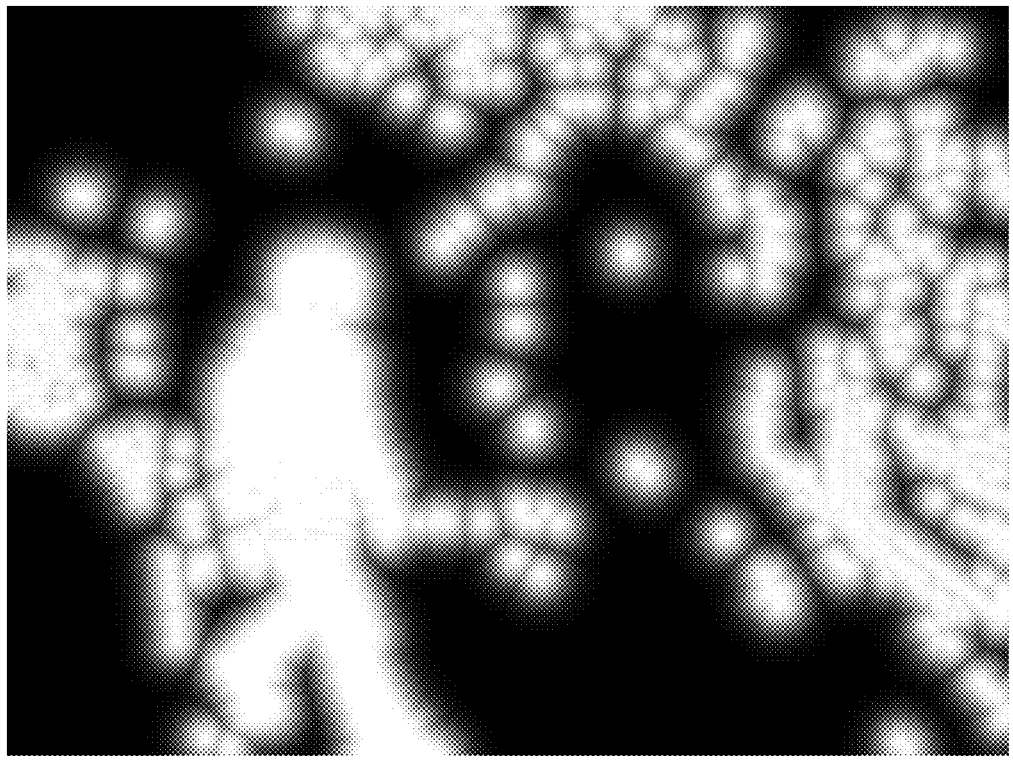
FIG. 3B show a continuous-tone ghost map generated from the binary ghost map of FIG. 3A using a smoothing method according to an embodiment of the present invention.

FIG. 3B show a continuous-tone ghost map generated from the binary ghost map of FIG. 3A by applying step S2 (S21 and S22).

Then, the HDR image is generated using the multiple brackets and the corresponding multiple continuous-tone ghost maps (step S3). The contribution of each image pixel of a bracket to the HDR image will depend on its corresponding ghost-weight value. For example, a pixel in a bracket having a ghost-weight of 1 (ghost) may be completely suppressed in the HDR image generation; a pixel having a ghost-weight of 0 (non-ghost) may be fully used in the HDR image generation; and a pixel having a ghost-weight $g_i$ between 1 and 0 may have a contribution proportional to $(1-g_i)$. Methods of generating an HDR image from multiple images and corresponding ghost maps are generally known; any such method may be used to accomplish step S3, so long as the ghost-weight values are taken into consideration as described above. In some HDR creation algorithms, one or more other multiplicative weights are applied to image pixel values. The HDR image can be generally expressed as follows:

$$E_i = \frac{\sum_{j=1}^{N} (1-g_{ij})w(I_{ij})F^{-1}(I_{ij})/\Delta t_j}{\sum_{j=1}^{N} g_{ij}w(I_{ij})}$$

where $E_i$ is the pixel value of HDR image, i is the pixel index, j is the bracket index, w is a weighing function, g is the ghost-weight, I is the pixel value in the input image, $F^{-1}$ is an inverse camera response function, and $\Delta t_j$ is a normalizing constant for bracket j to compensate for the difference in exposure levels of the brackets due to shutter speed, aperture, etc.

The ghost artifact removal methods described here can be implemented in a data processing system such as a computer 120 as shown in FIG. 4A. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

The method may also be implemented in hardwired circuits, such as one or more chips within a digital camera. FIG. 4B schematically illustrates a digital camera 130, which includes a processor 121, a storage device 132, and an internal memory 133, as well as an imaging section 134 for obtaining images and a control section 135 for controlling the various functions of the camera. The control section 135 may perform autobracketing to automatically take a set of images at different exposure levels. Autobracketing is well known and its details are omitted here. The processor 131 may process the set of images using the algorithm described above to generate an HDR image.

In one aspect, the invention is embodied in a data processing apparatus, which may be the data processing section of a digital camera. In another aspect, the invention is a computer program product embodied in computer usable non-transitory medium having a computer readable program code embedded therein for controlling a data processing apparatus. In another aspect, the invention is a method carried out by a data processing apparatus.

It will be apparent to those skilled in the art that various modification and variations can be made in the ghost artifact detection and removal method and related apparatus of the present invention without departing from the spirit or scope of the invention. Thus, it is intended that the present invention cover modifications and variations that come within the scope of the appended claims and their equivalents.

What is claimed is:

1. A method for generating a high dynamic range (HDR) image from a set of multiple images at different exposure levels, comprising:
   (a) detecting ghost-inducing objects in the set of multiple images to generate a binary ghost map for each image, each binary ghost map having a plurality of pixels, each pixel having either a first predetermined pixel value indicating that a corresponding pixel in the corresponding image is ghost-inducing or a second predetermined pixel value indicating that a corresponding pixel in the corresponding image is not ghost-inducing;
   (b) generating a continuous-tone ghost map from each binary ghost map, including:
      (b1) for each pixel of the binary ghost map that has the first predetermined pixel value, assigning the first predetermined pixel value to a corresponding pixel of the continuous-tone ghost map; and
      (b2) for each pixel of the binary ghost map that has the second predetermined pixel value, calculating a distance between the pixel and a nearest pixel in the binary ghost map that has the first pixel value, calculating a pixel value as a function of the distance, the function having the first predetermined pixel value when the distance is zero and changing monotonously toward the second predetermined pixel value when the distance is greater than zero, and assigning the calculated pixel value to a corresponding pixel of the continuous-tone ghost map; and
   (c) generating the HDR image using the set of multiple images and the corresponding continuous-tone ghost maps.

2. The method of claim 1, wherein the distance is calculated using a distance transform.

3. The method of claim 1, wherein the function of the distance is a Gaussian function.

4. The method of claim 1, wherein the first predetermined pixel value is 1 and the second predetermined pixel value is 0, and wherein when generating the HDR image, each image pixel in each of the multiple images is given a weight that is proportional to (1−g), where g is the pixel value of the corresponding pixel in the corresponding continuous-tone ghost map.

5. A computer program product comprising a computer usable non-transitory medium having a computer readable program code embedded therein for controlling a data processing apparatus, the computer readable program code configured to cause the data processing apparatus to execute a process for generating a high dynamic range (HDR) image from a set of multiple images at different exposure levels, the process comprising:
   (a) detecting ghost-inducing objects in the set of multiple images to generate a binary ghost map for each image, each binary ghost map having a plurality of pixels, each pixel having either a first predetermined pixel value indicating that a corresponding pixel in the corresponding image is ghost-inducing or a second predetermined pixel value indicating that a corresponding pixel in the corresponding image is not ghost-inducing;
   (b) generating a continuous-tone ghost map from each binary ghost map, including:
      (b1) for each pixel of the binary ghost map that has the first predetermined pixel value, assigning the first predetermined pixel value to a corresponding pixel of the continuous-tone ghost map; and
      (b2) for each pixel of the binary ghost map that has the second predetermined pixel value, calculating a distance between the pixel and a nearest pixel in the binary ghost map that has the first pixel value, calculating a pixel value as a function of the distance, the function having the first predetermined pixel value when the distance is zero and changing monotonously toward the second predetermined pixel value when the distance is greater than zero, and assigning the calculated pixel value to a corresponding pixel of the continuous-tone ghost map; and
   (c) generating the HDR image using the set of multiple images and the corresponding continuous-tone ghost maps.

6. The computer program product of claim 5, wherein the first predetermined pixel value is 1 and the second predetermined pixel value is 0, and wherein when generating the HDR image, each image pixel in each of the multiple images is given a weight that is proportional to (1−g), where g is the pixel value of the corresponding pixel in the corresponding continuous-tone ghost map.

7. The computer program product of claim 5, wherein the distance is calculated using a distance transform.

8. The computer program product of claim 5, wherein the function of the distance is a Gaussian function.

9. A digital camera comprising the computer usable non-transitory medium of claim 5, the digital camera further comprising:
   an imaging section for obtaining images; and
   a control section for controlling the imaging section to obtain the set of images having different exposure levels.

* * * * *